United States Patent [19]

Schuricht et al.

[11] Patent Number: 5,040,132
[45] Date of Patent: Aug. 13, 1991

[54] SYSTEM FOR PREPARING SHIPPING DOCUMENTS

[75] Inventors: Jurgen Schuricht, Lautertal; Reinhold Grocholl, Reichelsheim; Armin Zeiss, Lindenfels/Odw., all of Fed. Rep. of Germany

[73] Assignee: Pitney Bowes Inc., Stamford, Conn.

[21] Appl. No.: 546,656

[22] Filed: Jun. 28, 1990

Related U.S. Application Data

[63] Continuation of Ser. No. 323,760, Mar. 15, 1989, abandoned.

[51] Int. Cl.$^5$ .................. G06F 15/20; G06F 15/22
[52] U.S. Cl. .................. 364/523; 364/464.01; 364/464.03; 364/466
[58] Field of Search .............. 364/401, 403, 406, 407, 364/408, 464.01, 464.02, 464.03, 464.04, 466, 523

[56] References Cited

U.S. PATENT DOCUMENTS

| | | | |
|---|---|---|---|
| 4,410,961 | 10/1983 | Dlugos et al. | 364/464.03 X |
| 4,420,819 | 12/1983 | Price et al. | 364/466 X |
| 4,430,716 | 2/1984 | Dlugos et al. | 364/464.03 X |
| 4,481,587 | 11/1984 | Daniels, Jr. | 364/466 |
| 4,574,352 | 3/1986 | Coppola et al. | 364/466 |
| 4,713,761 | 12/1987 | Sharpe et al. | 364/406 |
| 4,797,832 | 1/1989 | Axelrod et al. | 364/464.02 X |
| 4,839,813 | 6/1989 | Hills et al. | 364/464.03 |
| 4,941,091 | 7/1990 | Breault et al. | 364/406 |
| 4,956,782 | 9/1990 | Freeman et al. | 364/464.03 |

OTHER PUBLICATIONS

Computerized Parcel Shipping System Summary, Pitney Bowes, 1986, pp. 1–45.
"The Mailroom Can Help Your Business Prosper", by Robert C. Lawrence, Jr., The Office, Aug. 1984, pp. 79–80.
"Helping to Move Freight Forward", Computer Systems, Oct. 1985, pp. 19–20.

Primary Examiner—Dale M. Shaw
Assistant Examiner—Michael A. Jaffe
Attorney, Agent, or Firm—Nathaniel Levin; Melvin J. Scolnick; Robert H. Whisker

[57] ABSTRACT

A system for preparing shipping documents includes a processor, a keyboard, a display, a memory and a printer. Associated with the printer are a single sheet feeder, a batch feeder and an endless form feeder. The system is capable of preparing a wide variety of waybills and other shipping forms. The system is also able to prepare automatically all shipping documents required for a mass shipment to a user-defined group of recipients. A user activated "help" function provides information specific to the type of data that the user is attempting to enter at the time the help function is activated. There is also a "rare shopping" function that allows the user to define for each shipping mode a group of other shipping modes for rate comparison purposes.

20 Claims, 19 Drawing Sheets

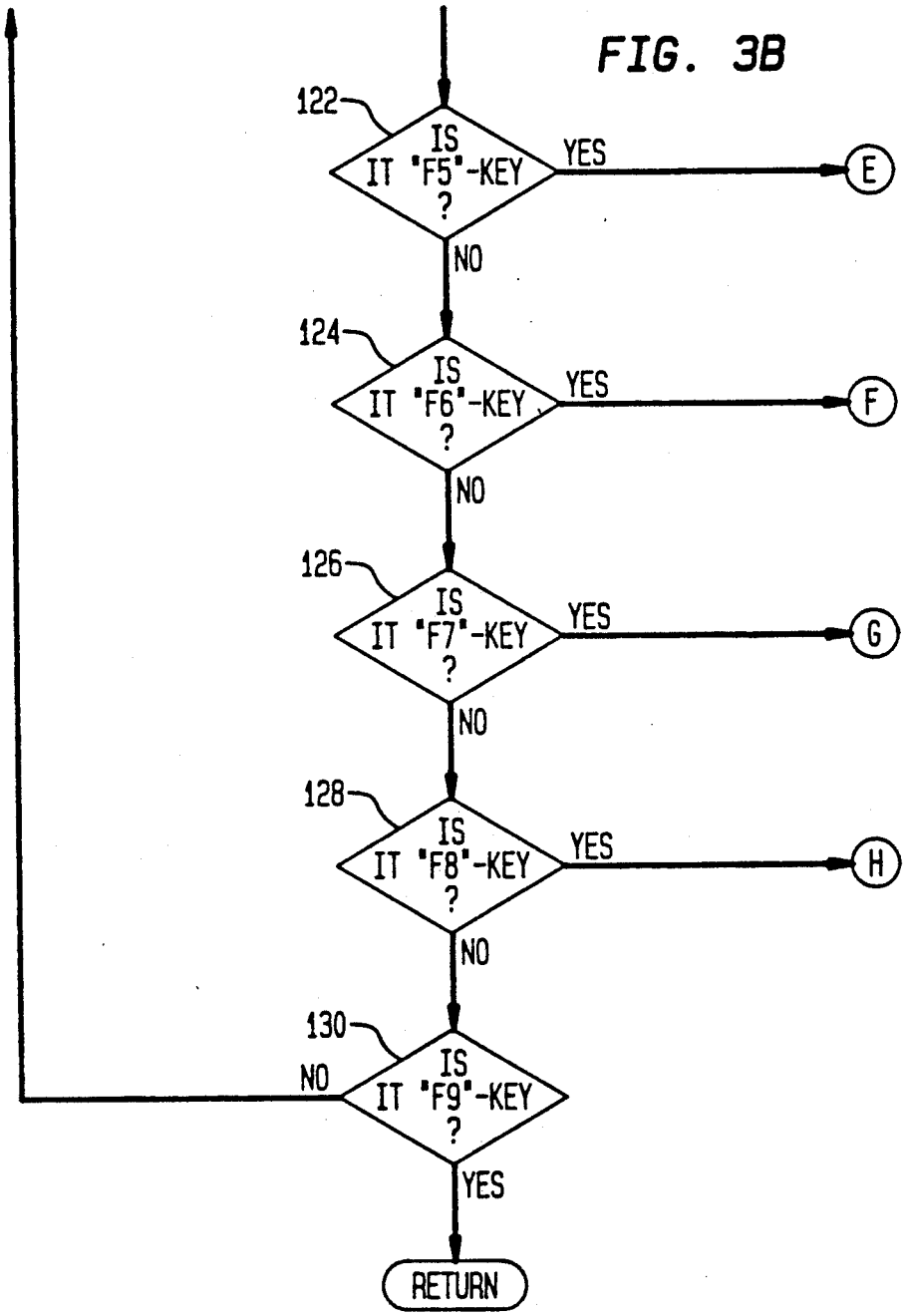

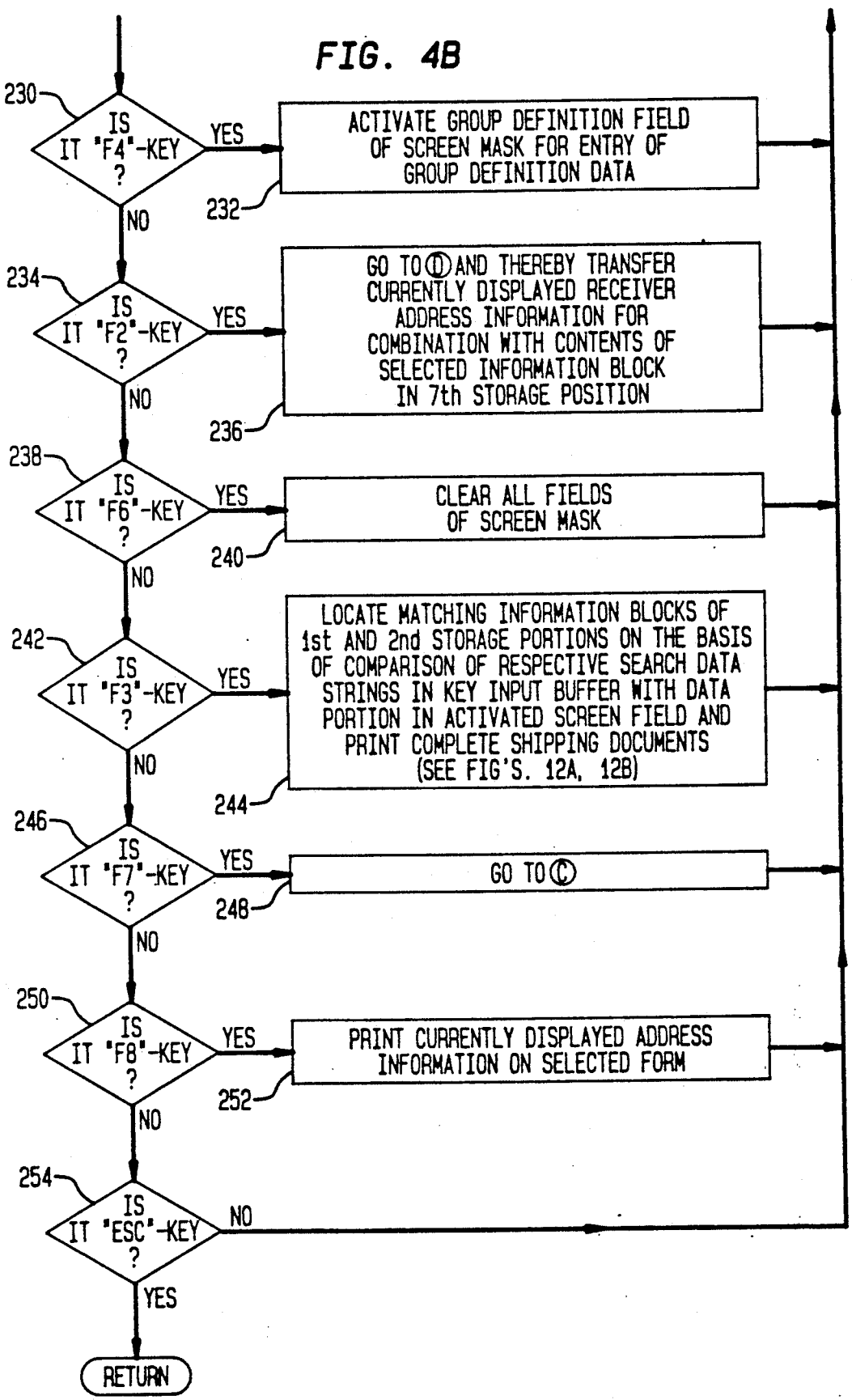

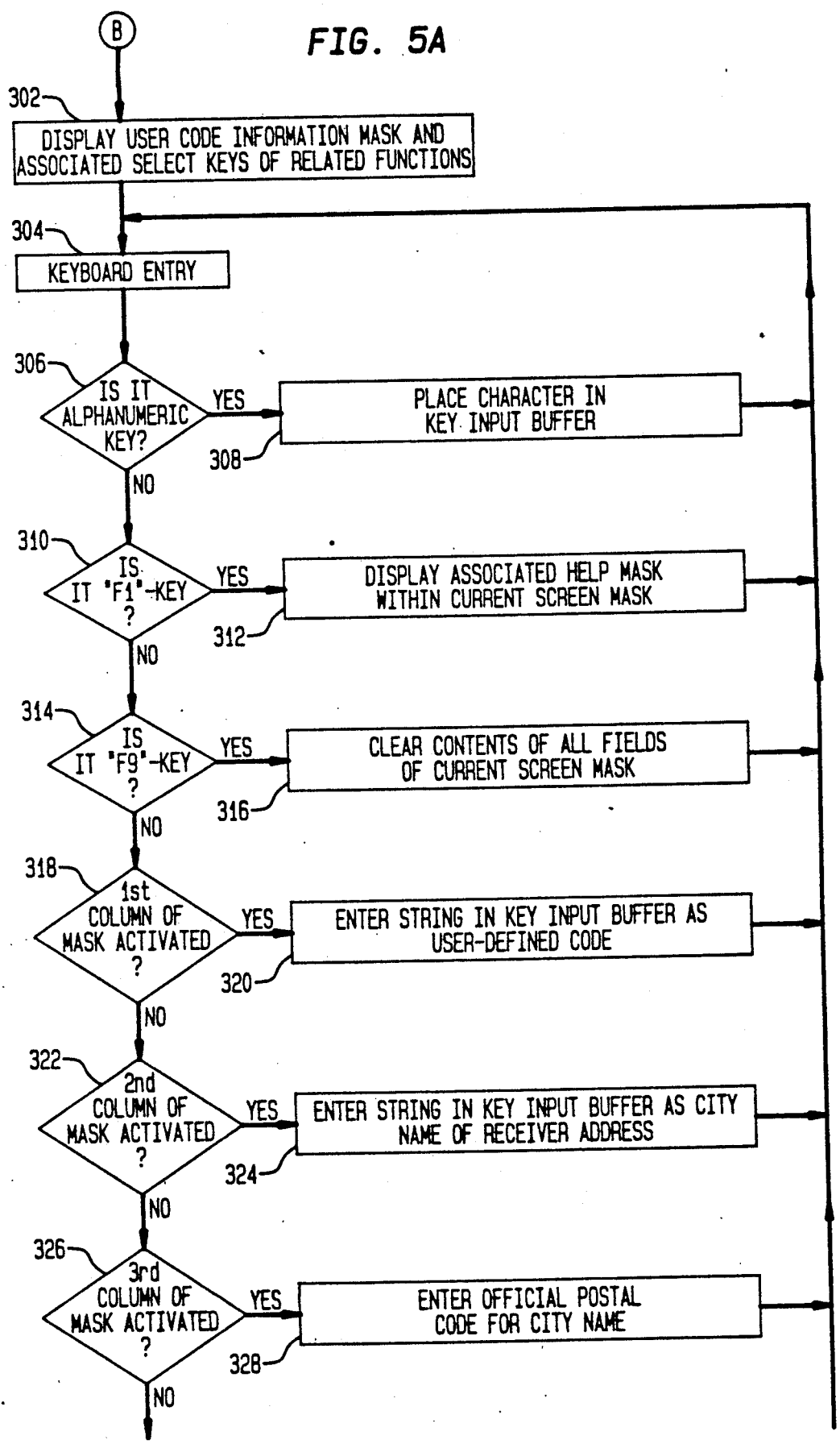

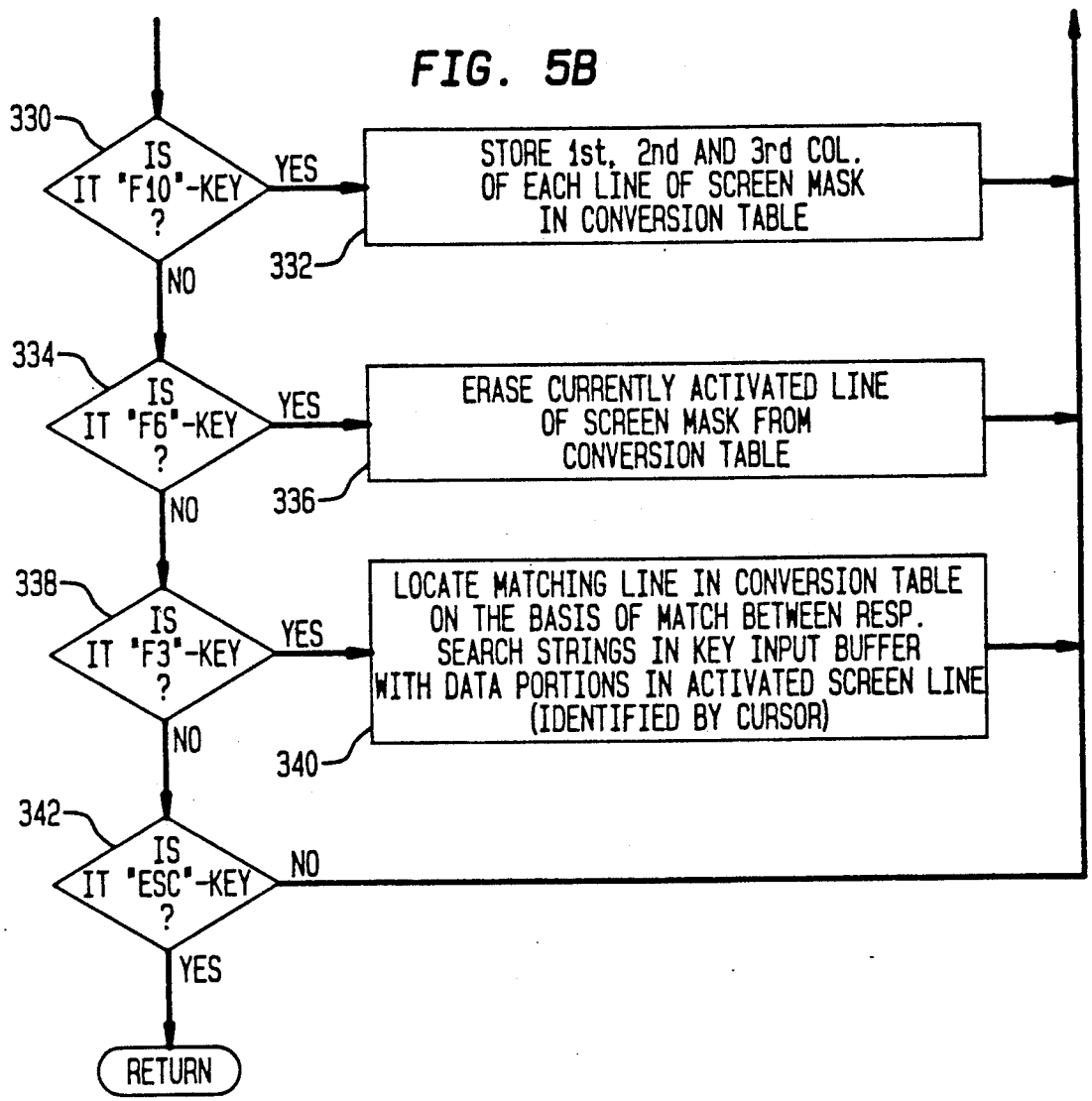

FIG. 7B

526 — STORE TEXT FROM INPUT BUFFER UNDER NAME IN INFORMATION BLOCK OF 7th STORAGE PORTION, MARK ALL ENTERED VARIABLES BY ENTERED ID-CODES FOR REFERENCE TO ADDRESS INFORMATION IN 1st STORAGE PORTION, RETURN

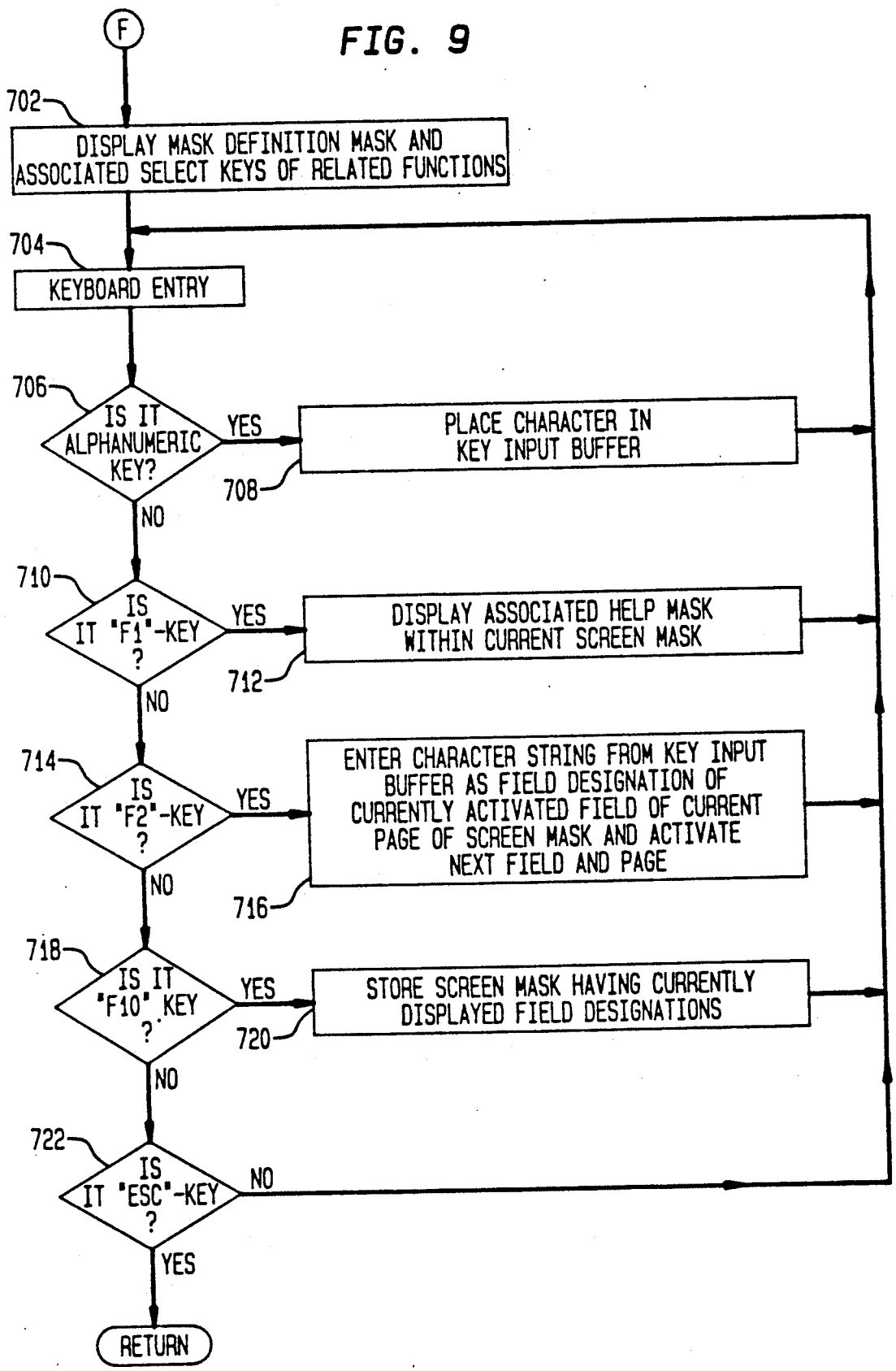

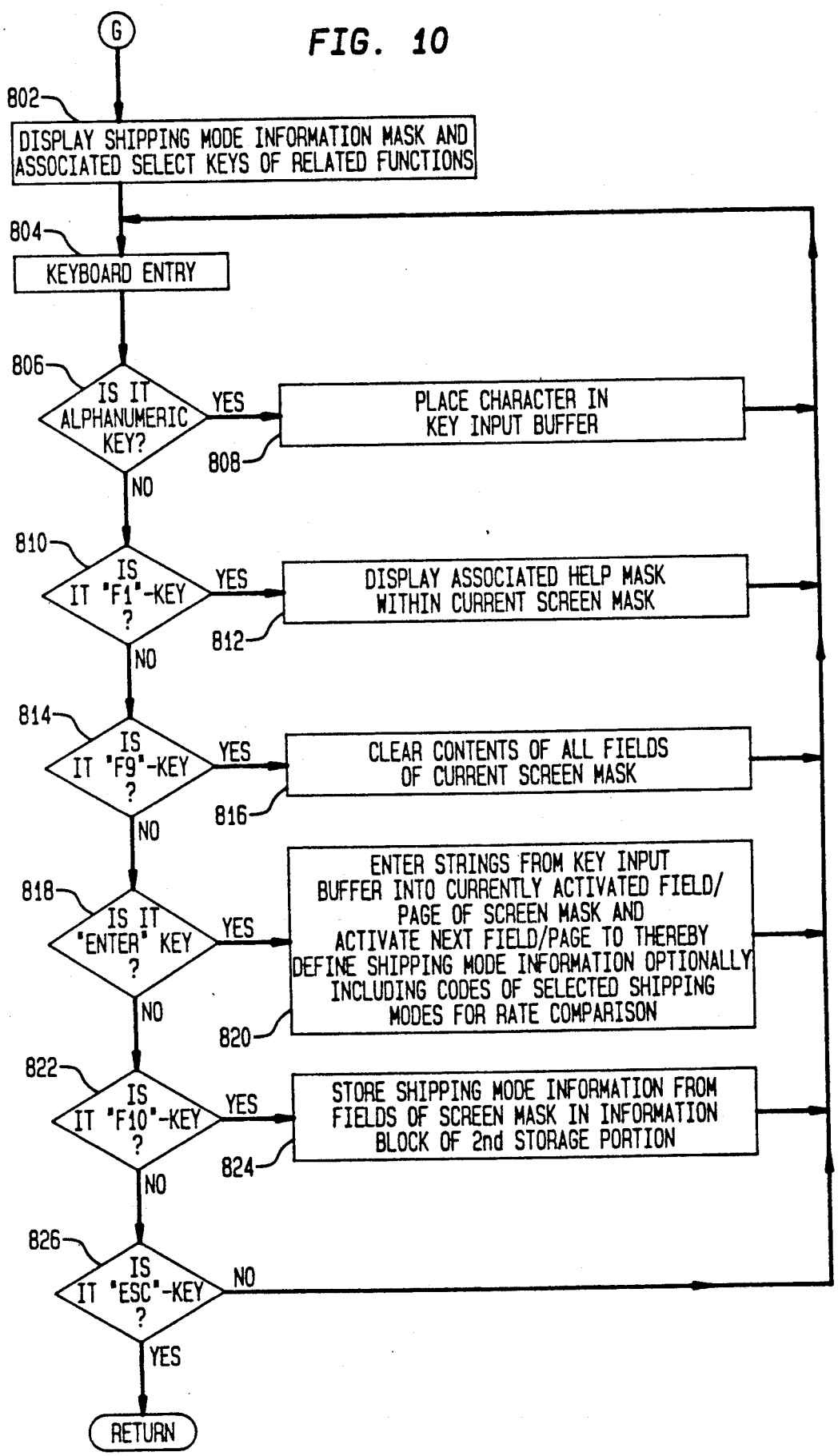

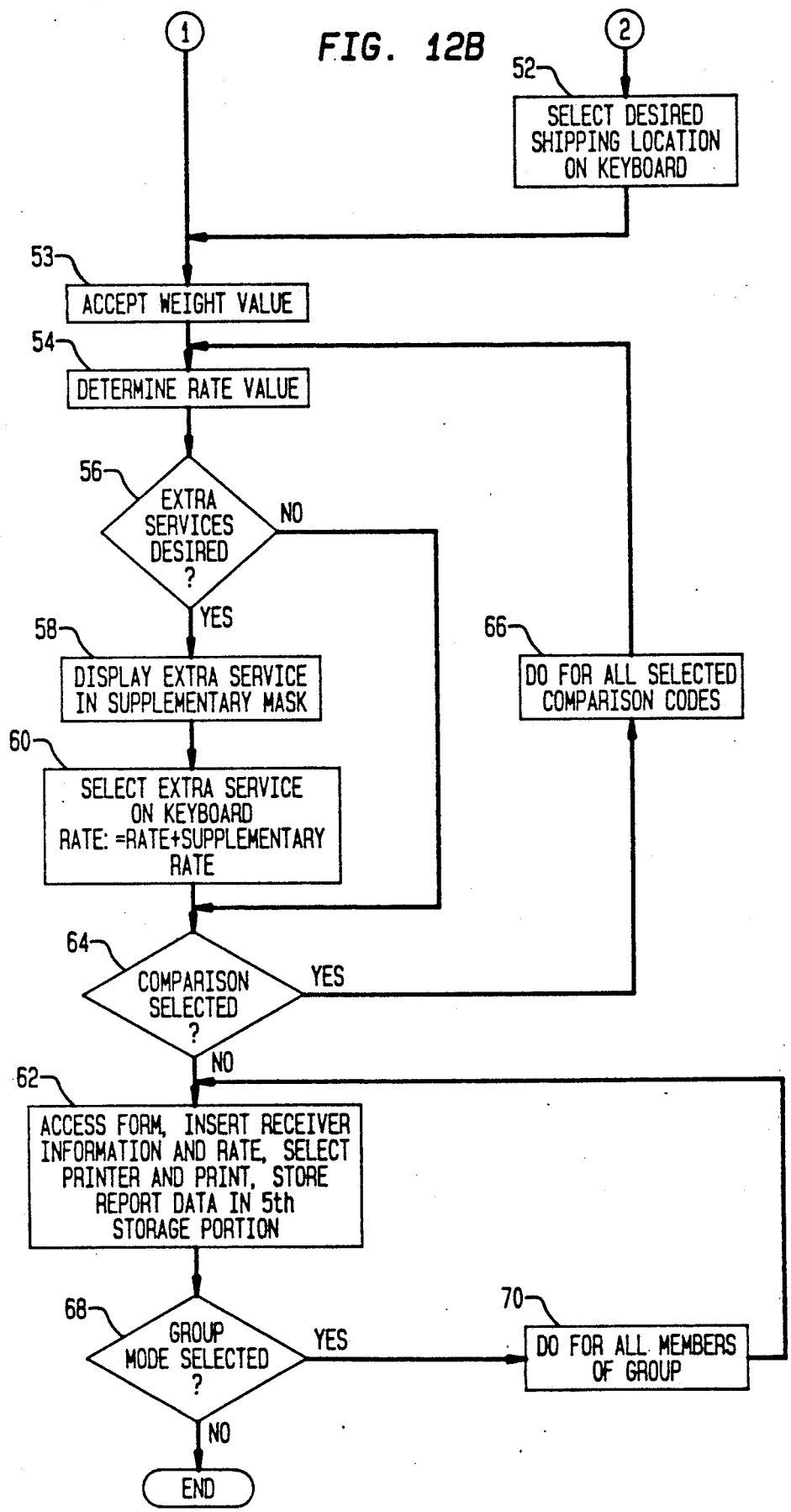

SYSTEM FOR PREPARING SHIPPING DOCUMENTS

This application is a continuation of application Ser. No. 323,760, filed Mar. 15, 1989, now abandoned.

BACKGROUND OF THE INVENTION

Reference is made to pending patent application number P 38 08 616.6, filed in West Germany on Mar. 15, 1988 by Pitney Bowes Deutschland, GMBH, the employer of the applicants, which application realtes to the same invention as this application and under which priority is claimed pursuant to 35 U.S.C., section 119. The invention relates to a system for processing articles for shipment, including a scale, a printer, a memory and a keyboard, and a processor coupled to these components.

Previously known systems have been used to prepare shipping documents, such as parcel labels, waybills, manifests, and the like. Although these systems have simplified to some extent the steps involved in preparing such documents, these systems were not capable of preparing the documents required for various shipping modes, such as mail, train, air freight or private carriers without overnight express, parcel post, air or surface freight, or private or public carriers, without substantial and time-consuming efforts by an operator. In addition, different rate tables, calculating modes and form requirements have to be observed. It should be noted that the various carriers each require documents that differ from one another in format and information required.

SUMMARY OF THE INVENTION

The invention relates to a system for automatically preparing documents for shipping articles to any desired number of different receivers by any selected shipping mode.

The system includes weight data entry means, a printer, memory, a keyboard and a processor. The weight data entry means, which is capable of causing the printer to print more than one type of waybill. The waybill as printed reflects the data received by the processor from the various components. Typically the system operates in the following manner:

The user inputs the weight of the article to be shipped, perhaps by placing the article on a scale, which is in communication with the processor. Through the keyboard, the user can select the recipient of the article from among those names and addresses that are stored in memory and retreivable through the keyboard. Next, again using the keyboard, the user selects the desired carrier and mode of shipment. The system then prints a waybill and, if necessary, other documents that the carrier requires to be submitted with the article to be shipped. The system according to this invention is more versatile than prior systems in that it is capable of printing a wide variety of documents required by carriers. Also, in its various embodiments, the system provides convenient features for the user that were not previously available.

DESCRIPTION OF THE DRAWING

FIG. 2 (a) to (g) shows the structure of information blocks provided in storage portions of storage means in an embodiment of said system.

FIG. 5 (a) and (b) a schematic flow chart of a routine for storing user-defined location codes.

FIG. 9 a schematic flow chart of a routine for user definition of mask format.

FIG. 10 a schematic flow chart of a routine for storing shipping mode information.

DETAILED DESCRIPTION OF THE PREFERRED EMBODIMENTS

Figures 1, 2A, 2B, 2C, 2D, 2E, 2F, 2G:
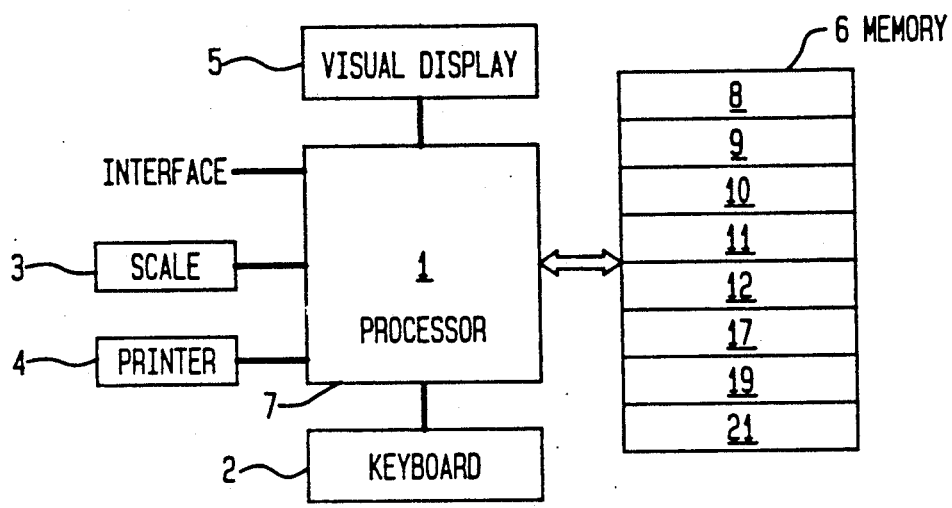
FIG. 1 shows a schematic diagram of a system for preparing shipping documents.

A system for preparing shipping documents is schematically represented in FIG. 1 and has a processor 1 connected to a keyboard 2, a scale 3 for weighing the articles to be shipped, and a printer 4. The processor is also connected to a visual display 5 and a memory 6, which is addressed by the processor 1 for random access in read and/or write operations. The processor 1 further includes an input/output interface 7 for connection with an external data source such as a host computer. The processor 1, operating under the control of a program, performs a number of functions as described below.

The memory 6 includes first, second, third, fourth, fifth, sixth and seventh storage portions (8, 9, 10, 11, 12, 19 and 21 respectively), which are accessed for various purposes by the processor while it performs its functions.

The first storage portion 8 of the memory 6 contains a desired first number of information blocks 13. The structure of the information blocks 13 are symbolically illustrated in FIG. 2 (a). As may be seen therefrom, the information block 13 has two associated blocks of storage locations, one of the blocks representing a recipient address text section for storing the recipient's address and the other block representing a location code section for storing a code that identifies the geographic location of the recipient.

The recipient address section includes other information such as a salutation, the name of the recipient and the address. The same section also includes a storage portion for storing additional alphanumeric information regarding the recipient, a section for storing a code representative of the recipient's preferred shipping mode and a section for storing group definition data that associates the recipient with a selected one of several groups. The recipient information which is stored in the information blocks of the first storage portion need not be restricted to mere addressing information like name, street, city and country or the like, but could include other information concerning customers. For this purpose, each of the information blocks in said first storage portion has a supplementary information section adapted for storing additional information other than recipient address information. Such additional information can include the products customarily bought by this recipient, prices, and sales history, such as a day-by-day history for current year and total for previous year.

The zip code corresponding to the receiver location can be contained in the location code section. Alternatively, the location code section can contain a code defined by the user that specifies a single recipient location. As will be discussed below, such a code enables the system to ascertain the appropriate rate for a shipment to that location even when the zip code has more than one rate zone.

A desired number of information blocks 14 is contained in the second storage portion 9 of the memory 6 as shown in FIG. 2 (b). The user may define an information block 14 for each shipping mode of each carrier the user desires to engage from time to time. The desired shipping modes can include overnight air express, parcel post, and air and surface freight. Each information block 14 contains three associated blocks of storage locations, one of these blocks representing a shipping mode text section for storing text data to identify a predetermined shipping mode, another block representing a rate code section for storing pointer information to a rate table, and the third block representing a form code section for storing pointer information to one or several predetermined forms.

The shipping mode text section contains all data necessary for identifying a predetermined shipping mode of a predetermined carrier.

In one embodiment of the invention, the user can define code values identifying each one of the available shipping modes. Each code value is stored in a shipping mode text section together with the code values of such other shipping modes as the user may select. As will be discussed below, this makes it possible for the user to do "rate shopping", i.e., to compare the amounts that would be changed by a number of carriers for transporting a given parcel to a given location. For each shipping mode there is a predetermined transportation rate charge table from which the charge is determined for shipping an article of a given weight a certain distance or to a certain zone. In the rate code section, pointer information is stored which identifies the applicable transportation rate table for the shipping mode identified by the information block 14.

For each shipping mode, the carrier requires that certain forms be submitted with the article to be shipped. These forms may include a prescribed way bill, a manifest or an address label. In the form code section pointer information is stored for identifying which and how many forms are required.

The transportation rate tables identified by the rate code sections of the information blocks 14 of the second storage portion 9 are each stored in information blocks 15 of the third storage portion 10.

According to FIG. 2 (c) these information blocks 15 contain, in a table section, storage locations which are addressable by (a) the contents of the location code section of the information block 13 (representing the zone of, or the distance to, the destination), and (b) the weight value of the article to be shipped, in order to enable read-out of the correct transportation rate value for every transported weight and every transportation distance or zone.

For example, in some countries public carriers like postal services or train services use zone-structured rate tables. For every sender location a zone conversion table is available from the carrier. This zone conversion table associates a unique distance zone number, e.g. numbers 1, 2, 3 ... up to some finite number n, to any receiver location as a function of its postal code. The processor then has to select this zone conversion table upon entry of the desired carrier and desired shipping mode and to determine the appropriate zone number based upon the receiver location postal code. With this zone number, the processor may then determine the transportation rate value as a function of the entered weight by reference to the applicable transportation rate table.

Some carriers make use of distance-related rate tables. For every sender location a table is available from which the shipping distance between the sender location and any receiver location may be read out, while the receiver location is defined in terms of its postal code and optionally an extension code discriminating between certain subareas within the area defined by the postal code. In the latter case manual or automatic conversion, as described in more detail below, has to be performed in order to determine the distance value on the basis of postal code. The distance value determined in this way defines the address for the table containing the applicable transportation rate values as a function of the weight of the parcel.

One or more of the information blocks 15 may include, according to FIG. 2 (c), an associated supplementary information section in which data corresponding to optional extra services and supplementary rates are stored. For instance the extra service "express transport" may be provided for a certain shipping mode and the normal transportation rate value has to be augmented by a fixed supplementary rate value.

The printing formats identified by the form code section of the information blocks 14 of the second storage portion 9, are according to FIG. 2 (d), in a desired fourth number of information blocks 16 stored in the fourth storage portion 11. Each information block 16 contains the control commands and text information data required for causing the printer to print out the form or forms required for a certain shipping mode. In the data stored in the information blocks 16 there are empty locations at the appropriate positions in which there is inserted prior to print out information necessary for completion of the form. That information is obtained from the information blocks 13, 15, and, if applicable 14.

Figure 12A:
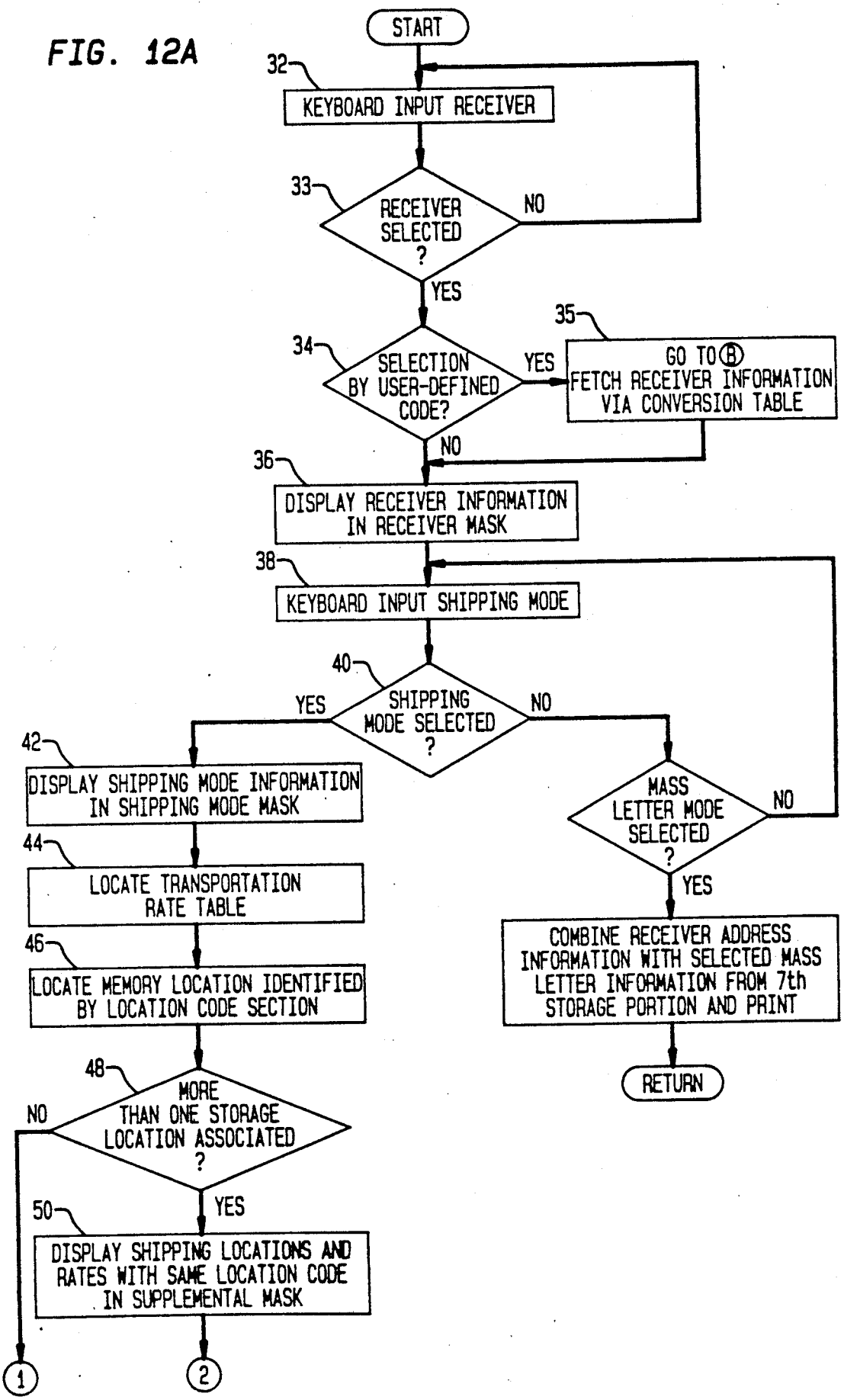

FIGS. 12 (a) and (b) illustrate the operation of the system when it is issued to prepare shipping documents. The process begins with selection of the desired recipient. This can be accomplished by entry via the keyboard of the recipient's name (steps 34 and 35) or address (steps 32 and 33) or an identifying code (steps 34 and 35) or entry of only a portion of one of those items.

Alternatively, the user may through the keyboard commence search operation, under control of a certain key of the keyboard 2, whereby the individual information blocks 13 are searched through one after the other to locate the information block 13 containing the data for the desired recipient.

In either case, once a valid recipient information block 13 has been selected the information contained in the information block 13 is displayed on the display embedded in an appropriate mask (step 36), as further discussed below. Then the keyboard 2 is enabled to select the desired shipping mode (step 38). This, can be accompanied by entry of an appropriate portion of the carrier name, or of a code therefore. Retrieval of the desired information block 14 may also be provided by successive search through all information blocks 14 provided in the second storage portion 9.

In response to the selection of the shipping mode, (step 40), the processor operates the display 5 so that it displays the shipping mode contained in the information block 14 (step 42). The processor simultaneously caused the display to show an appropriately designed mask on the screen which may for instance be called by access to a further storage portion 17 of the memory 6. In this way the user gets a clearly arranged and easily understandable visual representation of the information contents selected by him via the keyboard 2, since the masks include a format and supplementary text information that explains the selected information. The same use of masks occurs in steps 32–36, referred to above.

Moreover, in one embodiment of the invention the processor may be programmed to allow the user to alter the mask formats via the keyboard. This embodiment allows the user to customize the masks for the user's specific applications.

The system further incorporates help functions pertaining to the displayed screen masks. When the user activates a help key on said keyboard the help function is called and within a portion of the displayed mask instructional information on the further steps to be performed and the types of data that may be entered. The currently activated information line or block of the currently displayed screen mask is sensed by the processor, which then causes the display to show instructional information related to that currently activated information line or block.

On the basis of the rate code section read out from the information block 14 of the second storage portion 9 the processor 1 accesses from the third storage portion 10 the specific information block 15 identified by that rate code section (step 44). Then the process retrieves from that information block 15 the memory location therein identified by the contents of the location code section (step 46) then checks whether the contents of the read-out location code section is associated with one or with more than one memory locations of the transportation rate table (step 48). For example, this may be accomplished by storing those memory locations of the transportation rate table which are associated to one and the same location code in sequence one after the other. This allows the processor, after retreival of the first memory location corresponding to the location code section, to check the immediately following memory location in order to determine whether there are further memory locations for the same location code. If the location code associated with this memory location is different, then only one memory location in the rate table is associated with that location code. Otherwise, the processor continues to the next memory location, and if necessary the next, and so forth, until a different location code is found.

Then the processor inserts a supplementary mask into the currently displayed screen mask. The supplementary mask contains text to inform the user that more than one recipient location is identified by the location code. Also, there is displayed within that supplementary mask, the various recipient locations and associated transportation rate values corresponding to the same location code (e.g. to the same zip code) (step 50). Simultaneously the keyboard 2 is enabled to select the desired location (step 52).

The before-described manual selection between two or more memory locations storing transportation rate tables may occur when the postal code is used as location code while the selected shipping mode has a transportation rate structure with transportation rate values for different subareas of a single postal code area. Manual discrimination between the various subareas may, however, be avoided if the user predefines appropriate location codes as described hereinbefore. Such a user-defined code may, for instance, include the postal code supplemented by an extension for distinguishing the subareas. Having thus created a code which implies a one-to-one correspondence between the recipient addresses as identified by recipient location and subarea and the corresponding rate table entries, no manual discrimination is necessary and the system automatically accesses the applicable transportation rate table. The branch of control flow as represented by step 48 in FIG. 3 is then no longer required.

After the memory location corresponding to the desired destination location including the subarea identification, if any, has been determined, the processor 1 accepts the weight value of the piece to be dispatched from the scale 3 (step 53) and makes access to the cell within the corresponding memory location which is identified by the weight value in order to thereby read out the applicable transportation rate value (step 54).

In the embodiment illustrated in FIG. 1 the weight data entry means is scale 3 which automatically transmits the weight value to the processor 1. In other embodiments the weight data entry means may be an optical scanner to read weight information in the form of a bar code applied to the piece to be dispatched. It is also possible to program the processor 1 so that a numerical key section of the keyboard means 2 is enabled to input the weight.

As may be further seen from FIG. 12(b), the processor 1 now determines whether the information block 15 of the third storage portion 10 as accessed by the hitherto performed operating sequence comprises a supplementary information section. These data relating to optional extra services like express delivery, night delivery or the like and to the supplementary rate values applicable therefore are displayed by the processor 1 in a supplementary mask (step 58) which is inserted into the currently displayed screen mask and provides an explanation if the user indicates via keyboard 2 that an extra service is desired (step 56). Then the processor 1 enables the keyboard 2 to permit the user to select the desired extra service (step 60). After the user has selected the desired extra service in this way the corresponding supplementary rate value is added to the ordinary transportation rate value as determined according to the operating sequence described above.

As shown in step 62, on the basis of the memory signal read out from the form code section of the information block 14 the processor 1 means now selects the one or more information blocks 16 of the fourth storage portion 11 identified thereby and inserts the information concerning the recipient and the transportation rate value and optionally concerning the selected shipping mode into empty locations provided in the forms defined by the information blocks 16. Because of the association between shipping mode and form effected by the form code section it is assured that the correct form or forms for the desired shipping mode are always selected. The information which is thereby arranged in the applicable form format is then output by the processor 1 to the printer means 4 for print-out.

Also to be noted are steps 64 and 66, which respectively represent selection and execution of the rate shopping function described below. In addition, steps 68 and 70 respectively represent selection and execution of the group mode defined below.

By way of example, this invention may be embodied in a personal computer such as the NCR Model PC 810.

The printer 4 used in the illustrated embodiment preferably is capable of printing all the forms discussed in this specification and of operating in conjunction with a feeder for endless forms, a batch feeder and a feeder for single forms. A printer capable of performing in this manner, when controlled by the program that is part of this invention, is a Printer Model #7200, available from Juki Corporation, Chofu-shi, Tokyo, Japan. The Model 7200 printer includes a feeder for endless forms and a feeder for single forms. A batch feeder that operates with the Model 7200 is Model 7201 AMF, also available from Juki Corporation.

Depending on the memory contents of the form code section read out in accordance with the processing steps explained above, the processor 1 automatically selects the one or more feeders corresponding to the one or more required forms in sequence so that the forms may automatically be produced even though different feeders are required in view of the different physical properties of the forms.

Under the operating sequence described above the steps required for preparing shipping documents to any desired number of recipients in any desired shipping modes are minimized and simplified. Additionally the operating sequence comprises further functions in addition or ancillary to those represented in FIGS. 12 (a) and (b).

The report information is stored in said fifth storage portion 12 in each of information blocks 18 as symbolically represented in FIG. 2(e). Each information block 18 comprises a set of data relating to one individual executed shipping operation. This set of data comprises at least selected items from the memory contents of the recipient address text sections and the shipping mode text sections together with the related transportation rate value. The set of data also includes a parcel number which is automatically generated by the system for any executed shipping operation. Moreover, the calendar date and optionally day-time of the shipping operation is appended to this data set. For this purpose the system comprises real time generator means in order to automatically supply the calendar date and/or day-time for use with said protocol data. The set of data may also if the user desires, include additional information that the user has caused to be stored with the recipient's address.

The report information may be accessed via the keyboard 2 by the calendar date or by an interval of calendar dates and/or the recipient address and/or the shipping mode. Thus activity reports for all or selected ones from the group of all receivers or from all permissible shipping modes may be obtained for a desired interval, e.g. on a month-by-month, week-by-week or day-by-day basis or for whatever period the user desires. These reports may be displayed on the display 5 or may be output for printing or further processing. The processor is programmed to allow the user to define via the keyboard 2 both content and format of the desired reports.

A further function of the processor 1 which may be called by actuation of the keyboard 2 allows the user to obtain, for the purpose of comparison, the rates applicable for a variety of shipping modes, given a parcel's weight and its destination. This function is commonly known as "rate shopping". In this function, the processor determines the transportation rate value for the same recipient's address for alternative shipping modes and then displays the alternative transportation rate values in a corresponding screen mask. By actuation of the keyboard 2 the user may then select a preferred shipping mode from among the displayed alternatives, causing the printing of the documents required for that preferred shipping mode.

For the purposes of the rate shopping, a unique code value is assigned to each shipping mode as defined in the information blocks 14 and a set of code values is stored by the user in each information block 14, said set of code values determining for each shipping mode, those other shipping modes which are to be displayed for the purpose of comparison.

Thus the user is free to define for each shipping mode the other modes he wishes to see for rate shopping purposes. This is a more flexible rate shopping function than has been found in prior systems. In prior systems, shipping modes were grouped for rate shopping purposes, so that the same group of modes was displayed for comparison with each of the modes in that group. In the system of this invention, the user is free to define a unique comparison group for each mode. To illustrate this difference, in the present invention, the user may arrange, for instance that modes B, C and D be compared to mode A; modes C, D and E be compared to mode B, and modes D, E and F be compared to mode C. By contrast, in prior systems, the user was required to define groups, so that, assuming a defined group was A, B, C and D;

B, C and D would be compared to A
A, C and D would be compared to B
A, B and D would be compared to C; and
A, B and C would be compared to D without any flexibility. Further, if the user desired also to compare mode E to mode D, he was required to add E to the group, which meant that E would also be compared to modes A, B and C, even though that was not desired.

The system is capable of performing various calculations including a calculation of total amounts of transportation fees for all or selected groups of recipients or for selected ones out of the available shipping modes, i.e. available carriers. The system is also able to calculate the cubic volume of the pieces to be dispatched from the dimensions thereof.

There exist shipping modes in which the pieces to be dispatched utilize reusable packing material, e.g. reusable containers or pallets. In order to account for the issuing and return of these reusable packing materials a sixth storage portion 19 is provided in the memory means 6. A desired sixth number of information blocks 20 in said sixth storage portion 19 contains data for keeping track of each item of reusable packing material used in each shipping operation. Each set of such data includes at least a serial number for the packing material to be entered via the keyboard means 2 together with recipient address information that is automatically transferred from the corresponding information block 13 in the first storage portion 8 when the system prepares the shipping documents. Other information such as the type of packing material and the calendar date of issue and return may be included in such data.

Thus the status of reusable packing material for each individual shipping operation is stored in one information block 20. To access the information the system retrieves an individual information block 20 in response to entry of identification data via the keyboard 2. This identification data may, for instance, be the serial number or the recipient's name. Optionally retrieval may be effected for a certain issue date or interval of issue dates or the like. The data sets may be accessed individually or in groups and may be displayed on the display 5 or printed by the printer 4.

In the typical operation of the system as described above the user enters data to identify an individual recipient and a desired shipping mode. However, in certain applications it is desirable to send identical items to a predetermined group of recipients. For example, in operations such as book clubs, defined groups of subscribers are to receive identical parcels. The system therefore allows for storing of group definition data in each of the information blocks 13 containing the recipient addresses. The user is then only required to enter via the keyboard the corresponding group definition data together with the desired shipping mode and the weight value of the parcel 2 and the system then automatically prepares the required shipping documents for all recipients in the seclected group. Alternatively, the weight value may be entered by placing the typical parcel on the scale.

In the operating modes as described above it is assumed that all information with respect to recipient addresses, shipping modes, transportation rate structures and forms has previously been stored in the memory 6 and thus is accessible in the processor's first operating mode. The process may, however, by means of an appropriate actuation of the keyboard 2 be put into a second operating mode in which data entered by the keyboard means 2 may selectively be stored into the information blocks 13 to 16 of the storage portions 8 to 11. Thereby it is possible at any time to change, supplement or update such information via the keyboard 2. This process is most useful for changes and/or updates of a moderate extent. When substantial amounts of new or additional information must be input an advantageous feature of the invention is the input/output interface 7 connected to the processor 1. By means of the interface any desired storage portion may be programmed with data from an external data source. The external data source may for instance be a central computer. Use of such an external data source allows a large amount of information to be entered within a short time. This is especially advantageous in applications with a large number of recipient addresses.

When programming the first storage portion 8 with recipient address information from an external data source like a central computer it is especially advantageous simultaneously to include with recipient's address, information indicative of the recipient's preferred mode of shipment and any preferred special services. To enable the information blocks 13 of the first storage portion 8 to accommodate such information an extra code section is adapted for storing a code representing the preferred shipping mode and optionally a further code representing a preferred special service such as express shipping. With the address information supplemented by the coded information of customer's preferred shipping mode and/or preferred special service, the system may then automatically access the preferred shipping mode and/or preferred special service when access is made to the receiver address by the keyboard means 2. The transportation rate value is then calculated and all necessary shipping documents are prepared by the system on the basis of the preferred shipping mode and preferred special service without any need for the user to manually enter a shipping mode and/or special service.

The system also includes output interface means for communicating the information contents of at least the information blocks 13 in said first storage portion 8 to an external computer. For example, sales information contained in the information blocks 13, including recipient address, and even goods purchased and the prices thereof, as well as transportation changes may be transferred to another computer for automatic creation of invoices.

A seventh storage portion 21 optionally provided in the memory means 6 may include a seventh number of information blocks 22 for storing mass letter information. The system allows for selection of a desired one of these information blocks 22 and is operative to combine the mass letter information stored in the selected information block 22 with an address from an information block 13 in the first storage portion 8 upon selection by the keyboard 2. The combined address and mass letter information may then be printed by the printer for dispatch to the desired recipients. This may automatically be done for any selected group of recipients. The information stored in the individual storage blocks 22 of the seventh storage portion 21 may include marked positions to be supplemented by information at correspondingly marked positions in the information blocks 13 of the first storage portion 8. Thereby standard mass letter texts may be caused to include information specific to each recipient in addition to the address.

From the above description it is evident that the system is of high utility for all users which daily dispatch substantial amounts of parcels or other pieces to be shipped. Such users include replacement parts by suppliers, mail-order houses, banking houses, insurance companies, governmental authorities and other service organizations.

Following is an explanation of the program routines which enable the system to carry out functions described above.

Figure 3A:
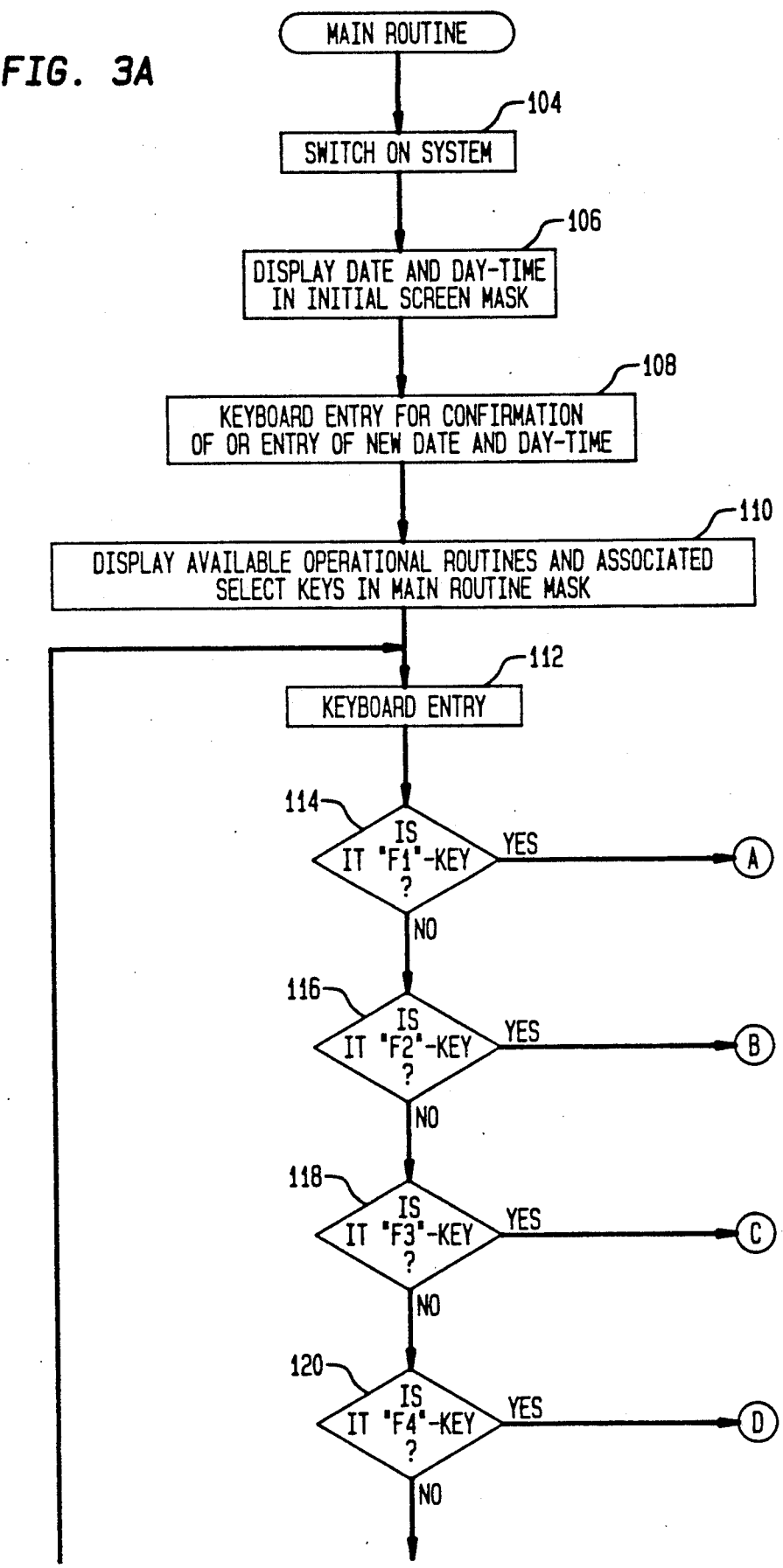
FIG. 3 (a) and (b) a schematic flow chart of a main routine for branching into various operational routines as provided for in an embodiment of the system.

FIGS. 3(a) and 3(b) are a flowchart for the main routine for the system.

The main routine begins when the system is switched on (step 104). The processor 1 then causes to be displayed on the display 5 the date and the time of day in an appropriate mask (step 106). The processor then waits until the user confirms the displayed date and time or enters the new date and time (step 108). Then the processor causes to be displayed the various functions which are available and identifies the keys to be used for selecting the functions (step 110). The processor then waits until a key is depressed (step 112). Once a key has been depressed the processor then determines whether it was the "F1" key that was depressed (step 114). If so, the processor implements the routine which allows entry and storage of recipient information (FIG. 4(a)). If not, the processor determines whether the "F2" key was depressed (step 116). If it was the "F2" key, the processor implements the routine for defining a location code (FIG. 5(a)). If it was not the "F2" key, the processor determines whether the 37 F3" key was depressed (step 118). If so, the processor implements the routine for defining a print format (FIG. 6(a)). If not, the processor determines whether the "F4" key was depressed (step 120). If it was the "F4" key, the procesor implements the routine for creating a letter for a mass mailing (FIG. 7(a)). If not, the system determines whether the "F5" key was depressed (step 122). If it was the "F5" key, the processor implements the routine for selecting a group of recipients (FIG. 8(a)). If not, the processor determines whether the "F6" key was depressed (step 124).

As before, if it was the "F6" key that was depressed, the processor implements the routine for defining a mask (FIG. 9).

Figure 11A:
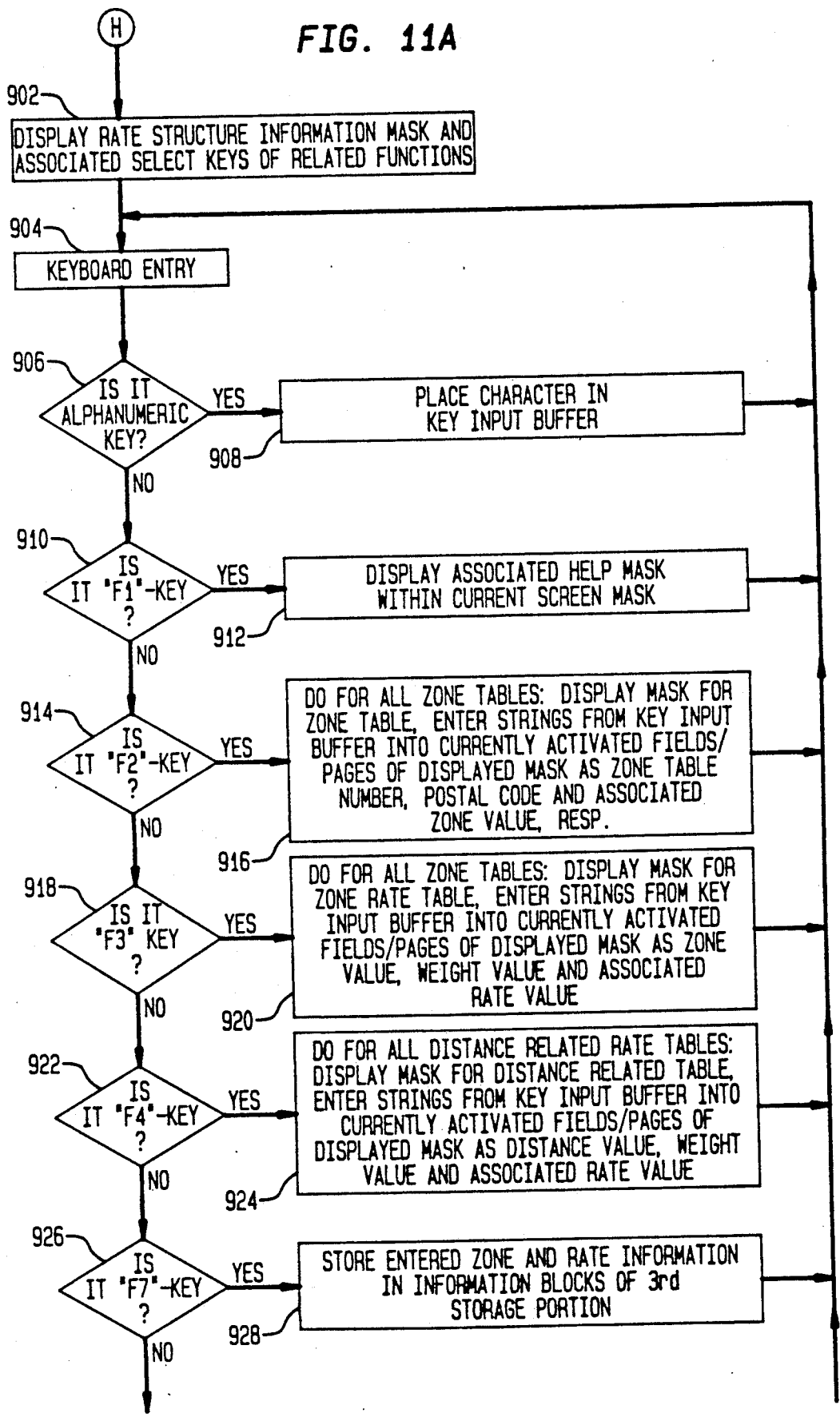
FIG. 11 (a) and (b) a schematic routine for storing of transportation rate information, and FIG. 12 (a) and (b) a schematic flow chart of the control flow of the system in an automatic shipping operation with automatic access to a transportation rate table.

If it was not the "F6" key, the processor determines whether the "F7" key was depressed (step 126). If so, the processor implements the routine for storing shipping mode information (FIG. 10). If it was not the "F7" key, the processor determines whether the "F8" key was depressed (step 128). If so, the processor implements the routine for storing rate information (FIG. 11(a)). If it was not the "F8" key, the processor determines whether the "F9" key was depressed (step 130). If so, the processor returns to step 110; if not, the system awaits a keyboard entry (step 112).

Figure 4A:
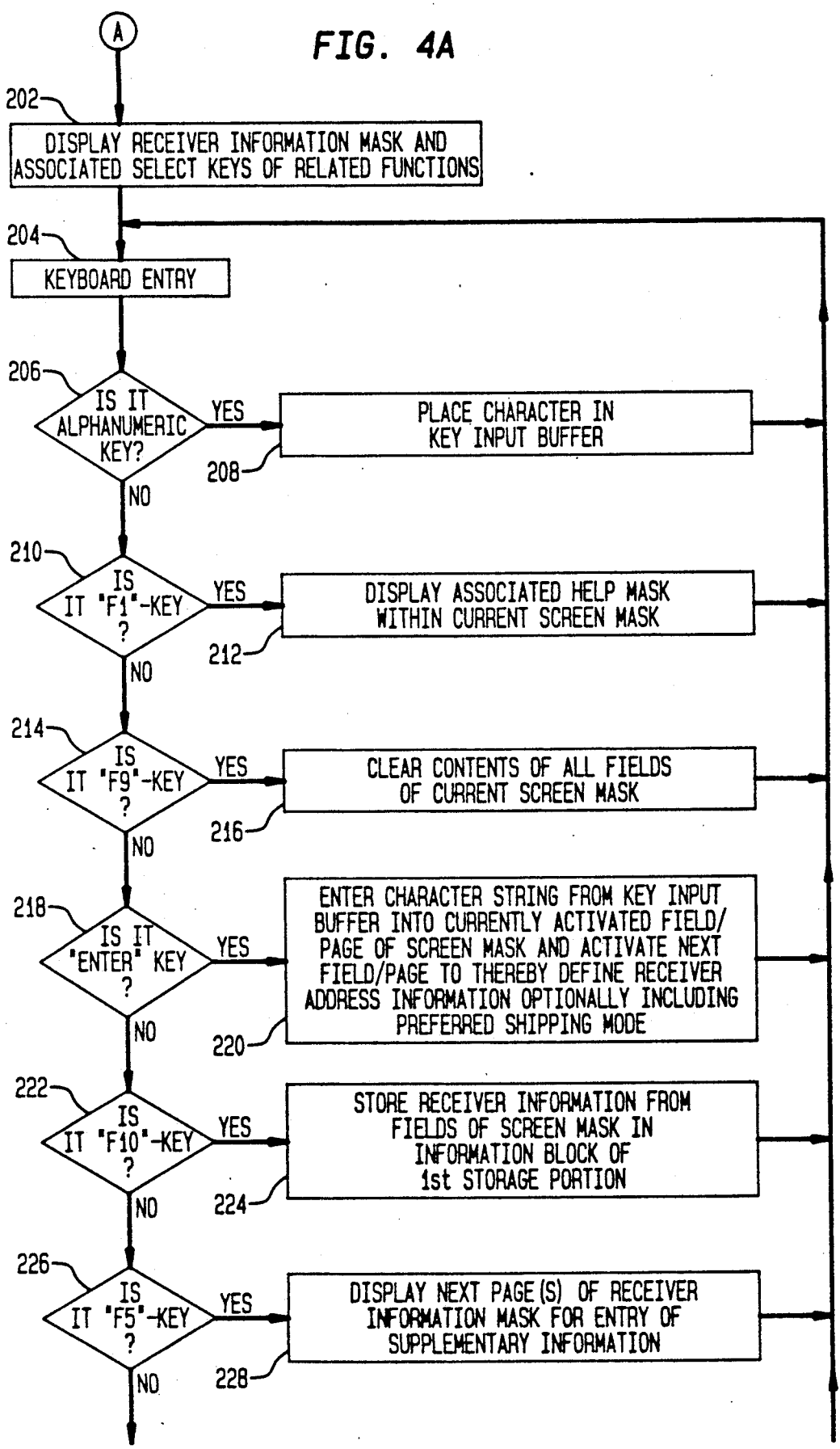
FIG. 4 (a) and (b) a schematic flow chart of a routine for storing recipient information.

FIGS. 4(a) and (b) are a flowchart for storing recipient information. At the beginning of the routine, the processor 1 causes to be displayed on the display 5 a mask for entry of recipient information (step 202). Included in the mask is information identifying the functions of the various function keys. The processor then waits until a key is depressed (step 204). Once a key has been depressed, then the processor determines whether the key depressed was an alphanumeric key (step 206). If so, the processor places the corresponding character in an input buffer (step 208) and then waits for another key to be depressed. If not, the processor determines whether the "F1" was depressed (step 210). If it was the "F1" key, the processor causes to be displayed within the current screen the help mask associated with the portion of the screen mask for which the user is attempting to input information (step 212). The processor then waits for another keystroke. If it was not the "F1" key that was depressed, the processor determines whether it was the "F9" key (step 214). If so, the processor clears the contents of all fields within the current screen mask (step 216) and then waits for another keystroke.

If it was not the "F9" key that was depressed, the processor determines whether it was the "enter" key (step 218). If so, the processor enters the character string which is in the input buffer into the field or page of the screen mask which the user has been attempting to complete (step 220). The processor then waits for another keystroke.

If it was not the "enter" key that was depressed, the processor determines whether it was the "F10" key (step 222). If so, the processor causes to be stored in an information block 13 of storage portion 8 the data which is contained in the fields of the screen mask (step 224). The processor then waits for another keystroke.

If it was not the "F10" key that was depressed, the processor determines whether it was the "F5" key (step 226). If so, the processor causes to be displayed the next page of the screen mask for entry of supplementary information (step 228). The processor then waits for another keystroke.

If it was not the "F5" key that was depressed, the processor determines whether it was the "F4" key (step 230). If so, the processor activates the field of the screen mask for entry of group definition data (step 232). Then the processor waits for another keystroke.

If it was not the "F4" key that was depressed, the processor determines whether it was the "F2" key (step 234). If so, the processor goes to the routine for creating a letter for mass mailing (step 236), as shown on FIGS. 7(a) and (b). If not, the processor determines whether it was "F6" key that was depressed (step 238). If it was the "F6" key, the processor clears all fields of the screen mask (step 240) and waits for another keystroke.

If it was not the "F6" key that was depressed, the processor determines whether it was the 37 F3" key (step 242). If so, the processor procedes to obtain the required shipping mode and rate information and print required shipping documents as illustrated on FIGS. 12(a) and (b) (step 244).

Figure 6A:
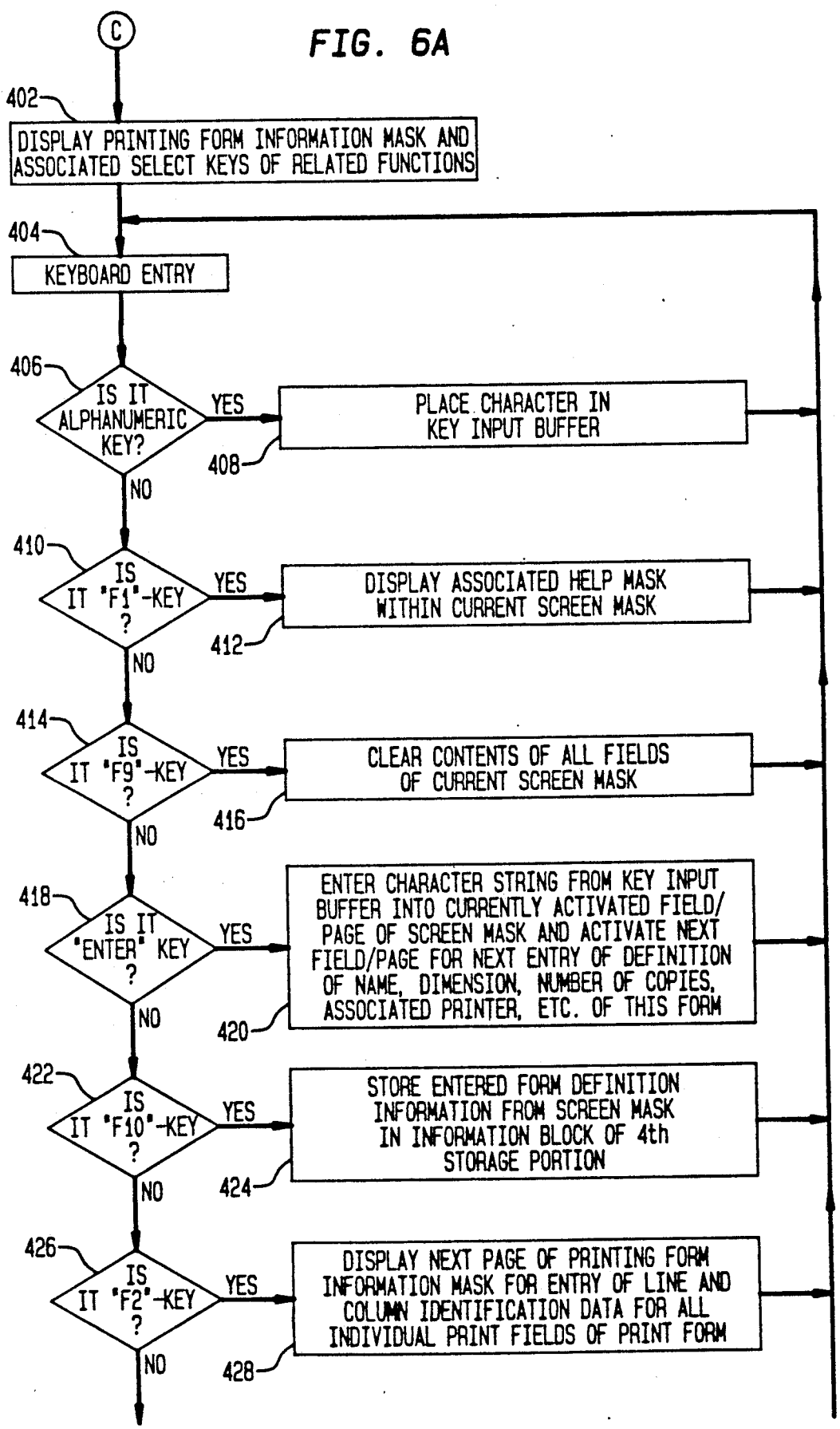
FIG. 6 (a) and (b) a schematic flow chart of a routine for storing printing form definition information.
Figure 6B:
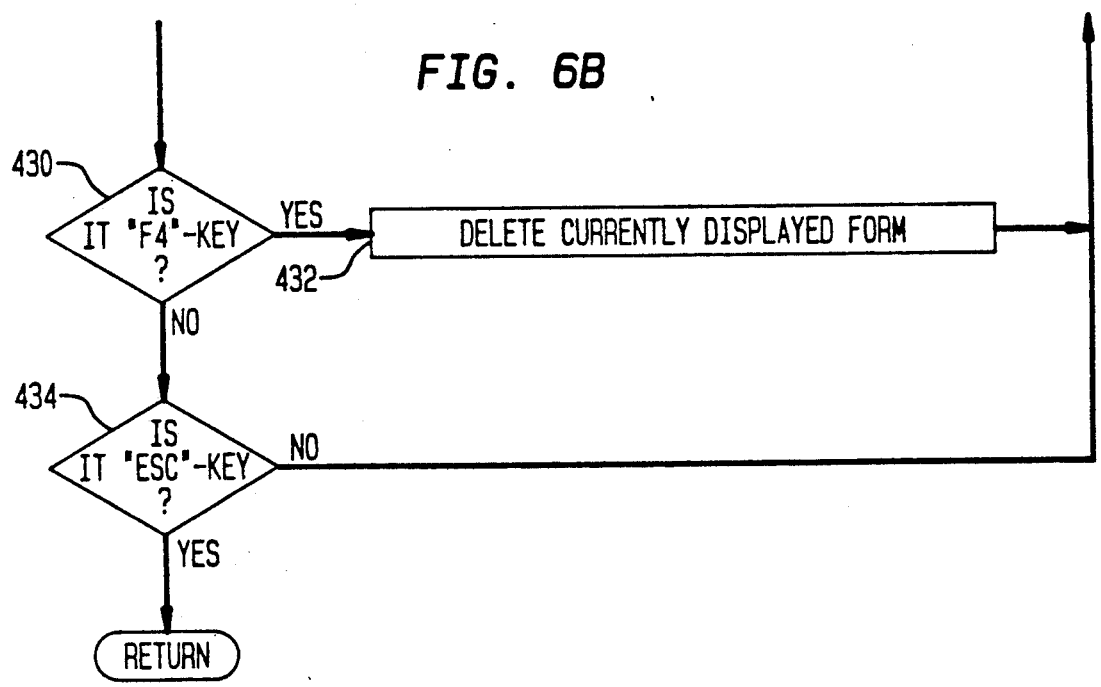

If it was not the "F3" key that was depressed, the processor determines whether it was the "F7" key (step 246). If so, the processor goes to the routine for defining printing formats (step 248) as shown in FIGS. 6(a) and (b). If it was not the "F7" key, the processor determines whether the "F8" was depressed (step 250). If so, the processor causes to be printed an appropriate shipping document using the address information currently displayed (step 252). If not, the processor determines whether it was the "ESC" (i.e. "escape") key that was depressed (step 254). If so, the processor returns to the main routine. If not, the processor waits for another keystroke.

FIGS. 5(a) and (b) show the routine that allows the user to define location codes. The routine begins with step 302 in which an appropriate mask is displayed, including an identification of the functions performed by the various function keys. The processor then waits for a key to be depressed (step 304). Then the processor determines whether the depressed key was an alphanumeric key (step 306). If so, the processor places the character in an input buffer (step 308) and then waits for a keystroke.

If it was not an alphanumeric key, the processor determines if it was the "F1" key (step 310). If so, the processor displays within the current screen mask a help mask associated with the field into which the user is attempting to enter data (step 312). Then the processor waits for another keystroke.

If it was not the "F1" key, the processor determines if it was the "F9" key (step 314). If so, the processor clears the contents of all fields of the current screen masks (step 316) and waits for another keystroke.

If it was not the "F9" key, the processor determines if it was the first column of the mask which was activated (step 318). If so, the processor causes the character string that is in the input buffer to be entered as a user defined code (step 320) then the processor waits for another keystroke.

If the first column was not activated, the processor determines whether the second column was activated (step 322). If so, the processor causes the character string that is in the input buffer to be entered as the name of the city of the recipient's address (step 324). Then the processor waits for another keystroke.

If the second column was not activated, the processor determines if the third column was not activated (step 326). If so, the processor causes the character string that was in the input buffer to be entered as the postal or zip code of the recipient's address (step 328). Then the processor waits for another keystroke.

If the third column was not activated, the processor determines if the "F10" key was depressed (step 330). If so, the processor causes the contents of the first, second and third columns of each line of the screen mask to be stored in the conversion table (step 332). Then the processor waits for another keystroke.

If it was not the "F10" key that was depressed, the processor determines whether it was the "F6" key (step 334). If so, the processor causes to be erased from the conversion table the line of the screen mask which was currently activated (step 336). Then the processor waits for another keystroke.

If it was not the "F6" key that was depressed, the processor determines if it was the "F3" key (step 338). If so, the processor locates a line in the conversion table based upon the character string that is in the input buffer and the line of the screen.

If it was not the "F3" key that was depressed, the processor determines whether it was the "ESC" (step 342). If so, the processor returns to the main routine. If not, processor waits for another keystroke.

FIGS. 6(a) and (b) show a flowchart for the routine which allows the user to define a printing format.

This routine begins with display of an appropriate screen mask, which includes identification of the functions performed for the various function keys (step 402). Then the processor waits for a key to be depressed (step 404).

Once a key has been depressed, processor determines whether it was an alphanumeric key (step 406). If so, the processor places the appropriate character in an input buffer (step 408) and then waits for another keystroke.

If it was not an alphanumeric key that was depressed, the processor determines if it was the "F1" key (step 410). If so, the processor causes to be displayed within the current screen mask a help mask associated with the item in the screen which the user is attempting to complete (step 412). Then the processor waits for another keystroke.

If it was not the "F1" key that was depressed, the processor determines whether it was the "F9" key (step 414). If so, the processor clears the contents of all fields of the current screen mask (step 416) and then waits for another keystroke.

If it was not the "F9" key, the processor determines if it was the "enter" key (step 418). If so, the processor causes the character string that is in the input buffer to be inserted into the currently activated field or page of the screen mask and then activates the next field or page (step 420). Then the processor waits for another keystroke.

If it was not the "enter" key that was depressed, the processor determines if it was the "F10" key (step 422). If so, the processor causes the information displayed within the screen mask to be stored in an information block 16 within the fourth storage portion 11 (step 424). Then the processor waits for another keystroke.

If it was not the "F10" key that was depressed, the processor determines if it was the "F2" key (step 426). If so, the processor causes to be displayed the next screen mask which contains information for defining the lines and columns of the printing fields for a particular form (step 428). The processor then waits for another keystroke.

If it was not the "F2" key that was depressed, the processor determines if it was the "F4" key (step 430). If so, the processor deletes the currently displayed form (step 432) and then waits for another keystroke.

If it was not the "F4" key, the processor determines if it was the "ESC" (step 434). If so, the processor returns to the main routine. If not, the processor waits for another keystroke.

Figure 7A:
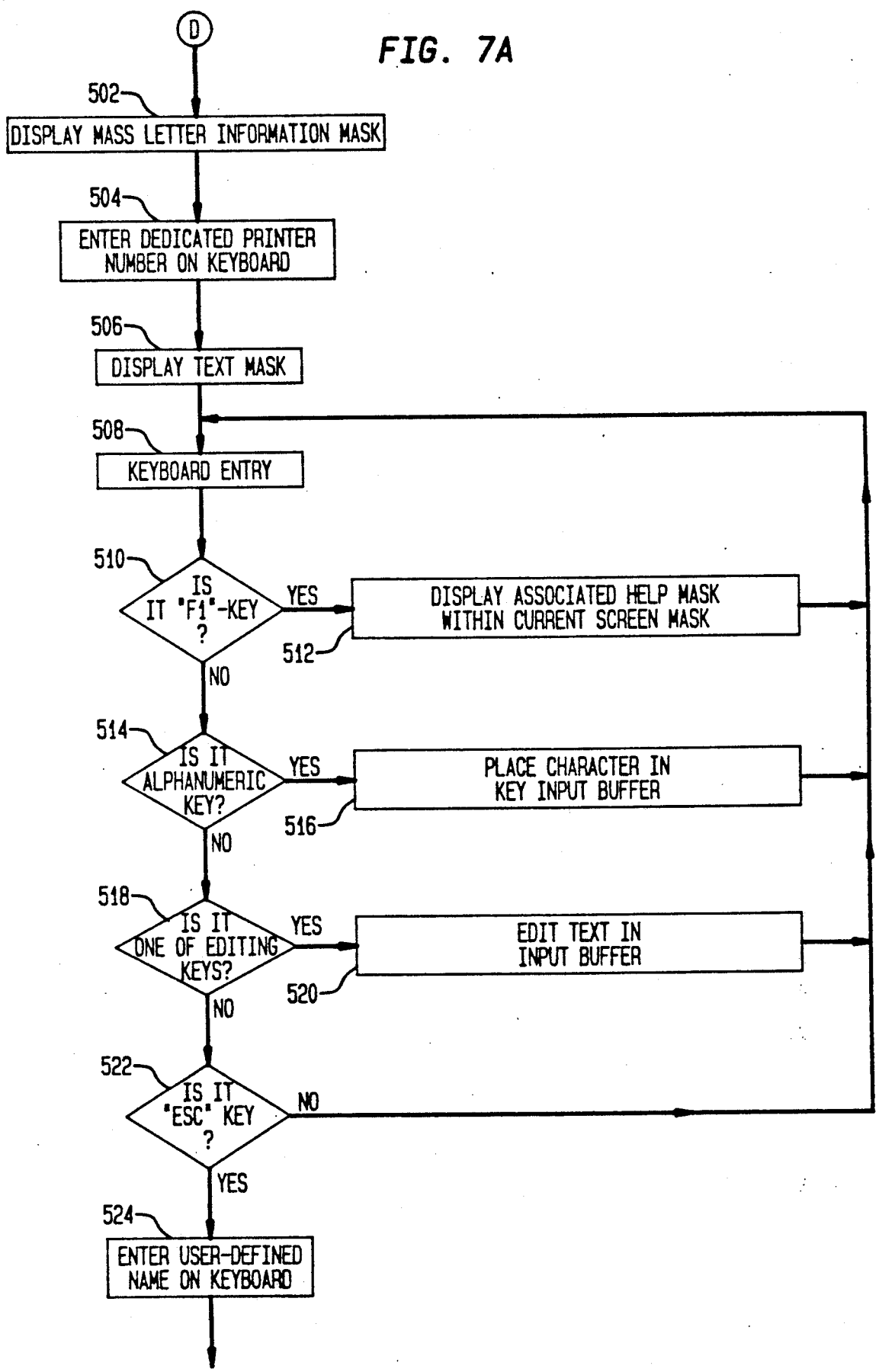
FIG. 7 (a) and (b) a schematic flow chart of a routine for mass letter processing.
Figure 8A:
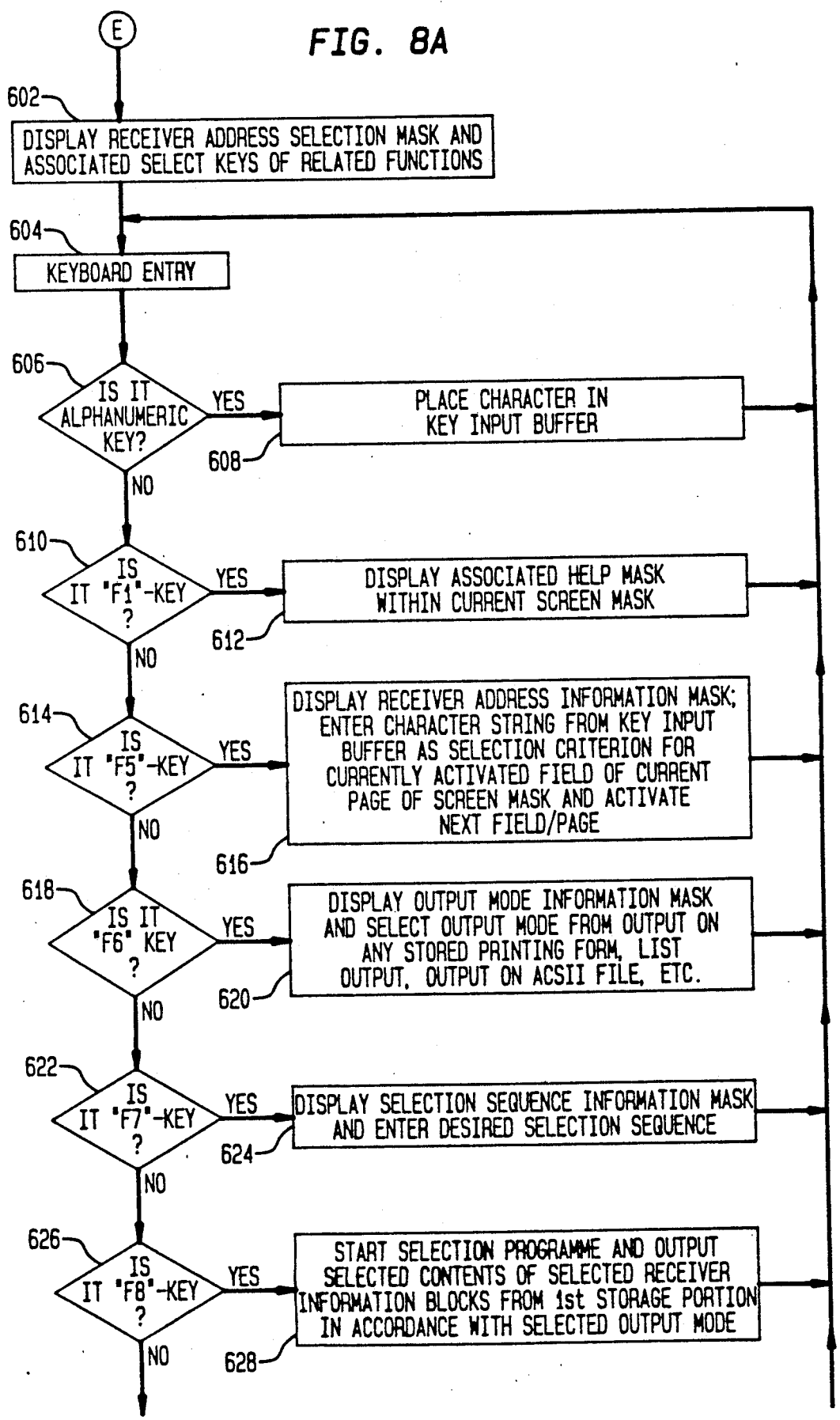
FIG. 8 (a) and (b) a schematic flow chart of a routine for selecting and processing a group of receiver addresses selected from the stored receiver addresses.

FIGS. 7(a) and (b) show a flowchart for a routine which allows the user to create a letter for a mass mailing.

The routine begins with step 502, in which an appropriate mask is displayed. Then the processor waits for the user to use enter via the keyboard the number of the printer to be used (step 504) then a mask is displayed that allows the user to create the text for the letter (step 506). Thereafter the processor waits for a key to be depressed (step 508).

Once a key has been depressed, the processor determines if it was the "F1" key (step 510). If so, the processor causes to be displayed an appropriate help information mask (step 512) and then waits for another key to be depressed.

If it was not the "F1" key that was depressed, the processor determines if it was an alphanumeric key (step 514). If so, the processor places the character associated with that key in the input buffer (step 516) and then waits for another key to be depressed.

If it was not an alphanumeric key, the processor determines if it was one of the editing keys (step 518). If so, the text in the input buffer is edited in the manner appropriate to the particular editing key that was depressed (step 520). Then the processor waits for another key to be depressed.

If it was not one of the editing keys, the processor determines if it was the "ESC" key (step 522). If not, the processor waits for another keystroke. If it was the "ESC" key, the processor prompts the user to enter a name for the letter that has just been created (step 524). Then the processor stores the letter under that name (step 526) and returns to the main routine.

Figure 8B:
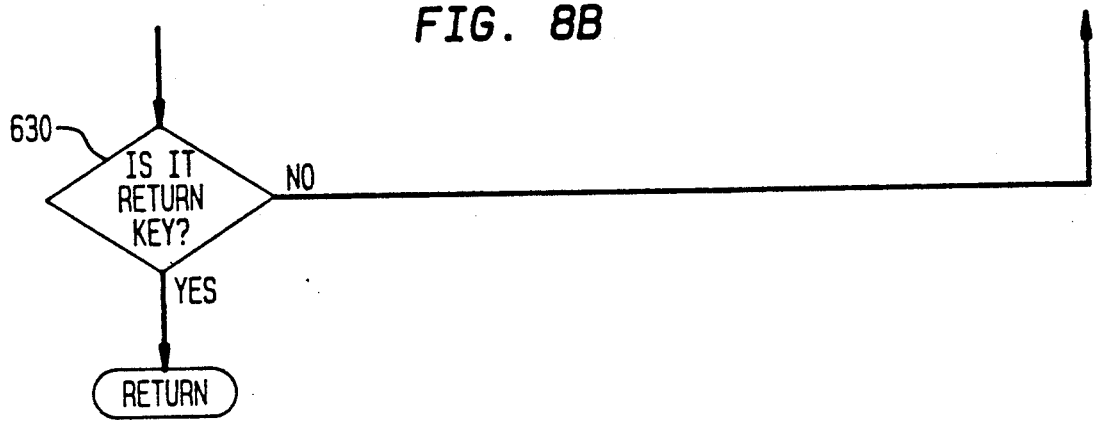

FIGS. 8 (a) and (b) show a flowchart for a routine that allows the user to select a group of recipients from among those for whom information has been stored in the memory.

The routine begins with step 602, in which an appropriate mask is displayed, including identification of the functions performed by the various function keys. The processor then waits for a key to be depressed (step 604).

Once a key has been depressed, the processor determines if it was an alphanumeric key (step 606). If so, the processor places in an input buffer the character associated with that key (step 608), and then waits for the next keystroke.

If it was not an alphanumeric key, the processor determines if it was the "F1" key (step 610). If so, the processor causes to be displayed help information relating to the field in the screen mask for which the user was attempting to input data (step 612). Then the processor waits for the next keystroke.

If it was not the "F1" key that was depressed, the processor determines if it was the "F5" key (step 614). If so, the processor displays another screen mask which includes a recipient's address and then allows the user to define group selection criteria through the keyboard (step 616).

If it was not the "F5" key, the processor determines if it was the "F6" key (step 618). If so, the processor causes to be displayed a mask which provides information regarding the possible output modes and allows the user to select an output mode (step 620).

If it was not the "F6" key, the processor determines if it was the "F7" key (step 622). If so, the processor causes to be displayed a mask containing information on possible selection sequences and then allows the user to choose a selection sequence (step 624).

If it was not the "F7" key, the processor determines if it was the "F8" key (step 626). If so, the processor selects the group of recipients and outputs that group in accordance with the choices previously made by the user (step 628).

If it was not the "F8" key, the processor determines if it was the "return" key (step 630). If so, the processor returns to the main routine, if not, the processor waits for another keystroke.

FIG. 9 is a flowchart for the routine which allows the user to customize screen masks.

This routine begins with step 702 in which an appropriate screen mask is displayed, including identification of the functions performed by the various function keys. Then the processor waits for a key to be depressed (step 704).

Once a key has been depressed the processor determines if it is an alphanumeric key (step 706). If so, the processor places in an input buffer the character associated with that key (step 708) and then waits for the next key to be depressed.

If it was not an alphanumeric key, the processor determines if it was the "F1" key (step 710). If so, the processor causes to be displayed within the current screen mask a help information mask associated with the portion of the current screen mask into which the user was attempting to input data (step 712). Then the processor waits for another keystroke.

If it was not the "F1" key, the processor determines if it was the "F2" key (step 714).

If so, the processor uses the character string that is in the input buffer as the designation of the currently activated field of the screen mask and then the processor activates the next field (step 716). Then the processor waits for the next key stroke.

If it was not the "F2" key, the processor determines if it was the "F10" key (step 718). If so, the processor causes to be stored in memory the screen mask as it is currently displayed (step 720). Then the processor waits for the next keystroke.

If it was not the "F10" key, the processor determines if it was the "ESC" key (step 722) if so, the processor returns to the main routine. If not, the processor waits for the next keystroke.

FIG. 10 shows a flowchart for a routine which allows the user to store shipping mode information.

The routine begins with step 802, in which an appropriate screen mask is displayed, including identification of the functions performed by the various function sheets. Then the processor waits for a key to be depressed (step 804).

Once a key has been depressed, the processor determines if it was an alphanumeric key (step 806). If so, the processor places in an input buffer the character associated with that key (step 808) and then waits for the next keystroke.

If it was not an alphanumeric key, the processor determines if it was the "F1" key (step 810). If so, the processor causes to be displayed within the current screen mask a help information mask associated with the field into which the user is attempting to enter data (step 812). Then the processor waits for the next keystroke.

If it was not "F1" key, the processor determines if it was the "F9" key (step 814). If so, the processor clears the contents of all fields of the screen mask (step 816). Then the processor waits for the next keystroke.

If it was not the "F9" key, the processor determines if it was the "enter" key (step 818). If so, the processor causes to be entered into the currently activated field of the screen mask the character string that is stored in the input buffer; the processor then activates the next field (step 820). This step may also include the rate shopping function described above.

If it was not the "enter" key that was depressed, the processor determines if it was the "F10" key (step 822). If so, the processor causes the information contained in the fields of the screen mask to be stored in an information block 14 in the second storage portion 9 (step 824). Then the processor waits for another keystroke.

If it was not the "F10" key, the processor determines if it was the "ESC" key (step 826). If so, the processor returns to the main routine. If not, the processor waits for the next keystroke.

Figure 11B:
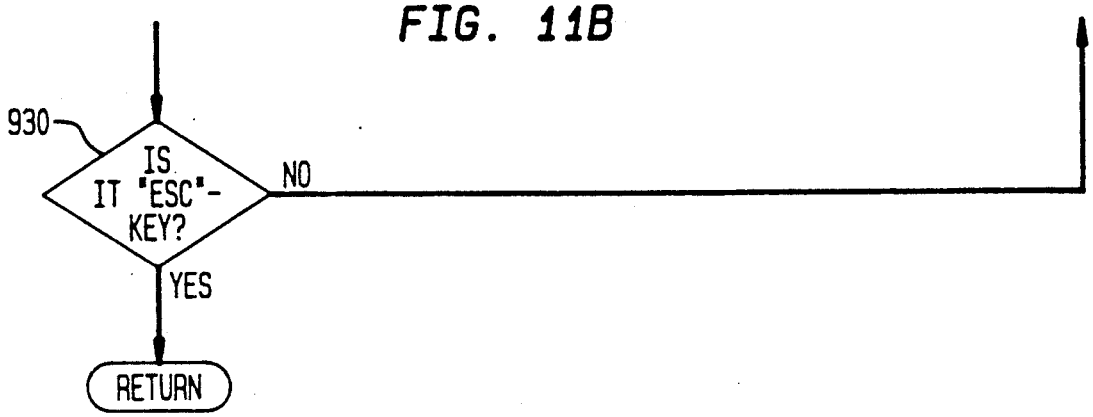

FIGS. 11(*a*) and (*b*) show a flowchart for a routine which allows the user to store rate information. The routine begins with step 902, in which an appropriate screen mask is displayed, including identification of the functions performed by the various function keys. Then the processor waits for a key to be depressed (step 904).

Once a key has been depressed, the processor determines whether it was an alphanumeric key (step 906). If so, the processor places in an input buffer the character associated with that key (step 908) and then it waits for another keystroke.

If it was not an alphanumeric key, the processor determines whether it was the "F1" key (step 910). If so, the processor causes to be displayed within the current screen mask an additional help information mask associated with field into which the user was attempting to input data (step 912). Then the processor waits for the next keystroke.

If it was not the "F1" key, the processor determines if it was the "F2" key (step 914). If so, the processor allows entry of zone and postal code information in tabular form (step 916).

If it was not the "F2" key, the processor determines if it was the "F3" key (step 918). If so, the processor allows entry in a zone table of weight values and associated rate values (step 920).

If it was not the "F3" key, then the processor determines if it was the "F4" key (step 922). If so, the processor allows entry of distance, weight and associated rate values for a distance related rate table (step 924).

If it was not the "F4" key, the processor determines if it was the "F7" key (step 926). If so, the processor causes the table information to be stored in an information block 15 of the third storage portion 10 (step 928).

If it was not the "F7" key, the processor determines if it was the "ESC" key (step 930). If so, the processor returns to the main routine. If not, the processor waits for the next keystroke.

We claim:

1. An apparatus for preparing shipping documents required by parcel carriers who have different types of forms for shipment of articles, comprising:
   (a) weight data entry means for entering data representing a weight of an article to be shipped, a printer, a memory, a keyboard;
   (b) a processor connected to the weight data entry means, the printer, the memory, and the keyboard;

(c) first means for feeding single forms to the printer;
(d) second means for storing a batch of forms and feeding the forms of the batch to the printer; and
(e) third feeding means for feeding continuous forms to the printer;
said memory storing carrier form data for a plurality of carriers and said keyboard being operable to send a carrier selection signal, said signal indicating selection of one of said plurality of carriers; and
said processor being programmed to:
(i) receive said carrier selection signal; and
(ii) select, in accordance with the carrier form data for said selected one of said plurality of carriers, one of said first, second and third means to feed a form to said printer.

2. The apparatus of claim 1, wherein said first means includes means for feeding forms of different dimensions.

3. The apparatus of claim 2, wherein said second means includes means for storing and feeding forms of different dimensions.

4. The apparatus of claim 1, wherein the weight data entry means is a scale generating an electrical output signal which corresponds to the weight of the article to be shipped.

5. The apparatus of claim 1, wherein the weight data entry means is a light scanning, bar code reader connected to the processor.

6. The apparatus of claim 1, wherein the weight data entry means is the keyboard.

7. The apparatus of claim 1, wherein the processor is a microprocessor.

8. The apparatus of claim 1, wherein:
the stored carrier form data for at least one of said plurality of carriers indicates that said at least one carrier requires at least two forms; and
said at least one carrier having been selected, said processor selects a first one of said first, second and third means to feed a first of said at least two forms and subsequently selects a second one of said first, second and third means to feed a second of said at least two forms.

9. In an apparatus for preparing shipping documents relating to the shipment of parcels, said apparatus having weight data entry means, a printer, a memory, a keyboard and a processor connected to the weight data entry means, the printer, the memory and the keyboard, the improvement comprising:
(a) means for storing in the memory names and addresses of recipients of parcels;
(b) means for storing in the memory second information relative to parcels received by the recipients;
(c) first means for feeding single forms to the printer;
(d) second means for storing a batch of forms and feeding the forms of the batch to the printer; and
(e) third means for feeding continuous forms to the printer;
said memory storing carrier form data for a plurality of carriers; said form data identifying which and how many forms are required by each of said carriers, said memory storing said recipients' preferred carrier of said plurality of carriers, said keyboard being operable to send a recipient selection signal, said recipient selection signal indicating selection of one of said recipients, said processor being programmed to:
(i) receive said recipient selection signal;
(ii) refer to said stored carrier form data for said selected recipient's preferred carrier; and
(iii) sequentially select, in accordance with the form data for said selected recipient's preferred carrier, at least one of said first, second and third means;
whereby said at least one of said first, second and third means feeds to the printer said identified required forms for said preferred carrier upon selection of said selected recipient.

10. The improvement of claim 9, wherein said second information comprises information relative to goods purchased by the recipients.

11. The improvement of claim 10, wherein said information relative to goods purchased includes dates of purchase.

12. The improvement of claim 11, wherein said information relative to goods purchased further includes prices of the goods purchased.

13. The improvement of claim 12, further comprising means associated with the processor for transmitting in computer-receivable form said information relative to the parcels.

14. The improvement of claim 9, wherein said recipient selection signal comprises the name of one of said recipients.

15. The improvement of claim 9, wherein said recipient selection signal consists of a portion of the name of one of said recipients.

16. The improvement of claim 9, wherein said recipient selection signal comprises the address of one of said recipients.

17. The improvement of claim 9, wherein said recipient selection signal consists of a portion of the address of one of said recipients.

18. The improvement of claim 9, wherein said recipient selection signal comprises an identification code that identifies only one of said recipients.

19. The improvement of claim 9, wherein said recipient selection signal consists of a portion of an identification code that identifies only one of said recipients.

20. The improvement of claim 9, further comprising a display connected to the processor and means associated with the keyboard for defining a format in which information relative to said selected recipient is to be displayed.

* * * * *